April 1, 1969  K. SILVON  3,435,860
TOP SHARPENING, FLOATING SPROCKET CHAIN SAW
Filed Nov. 18, 1966
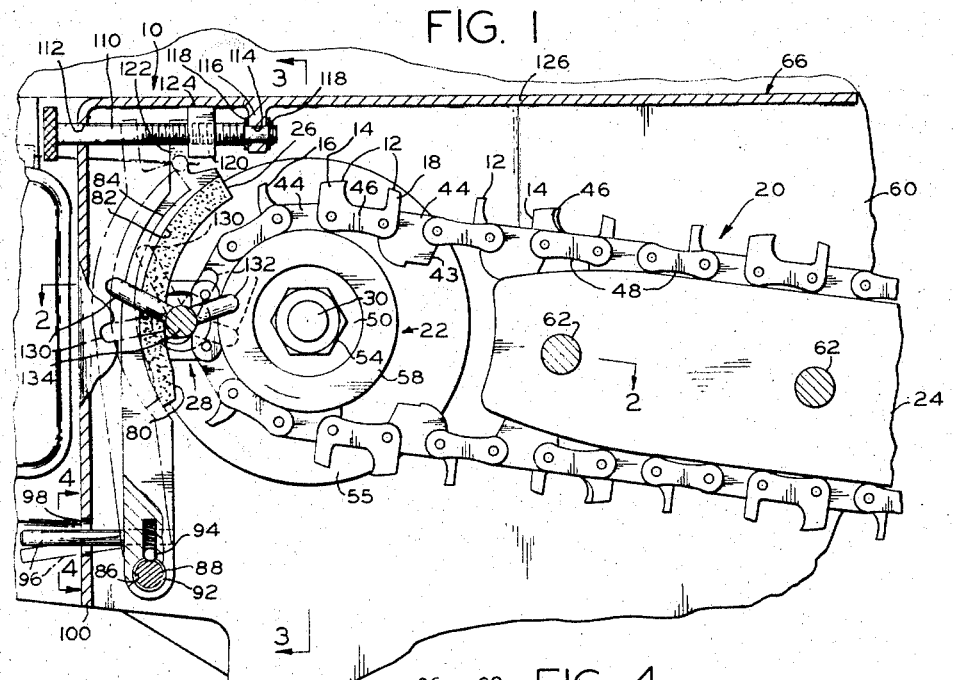
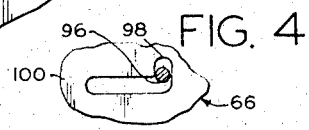
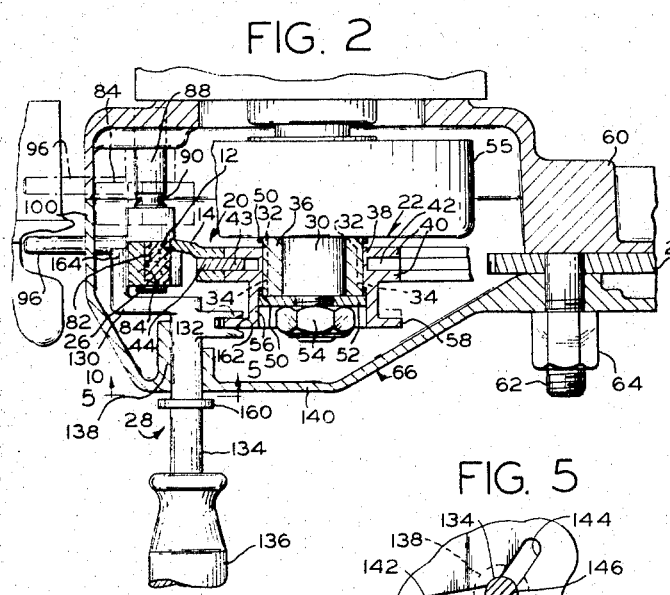
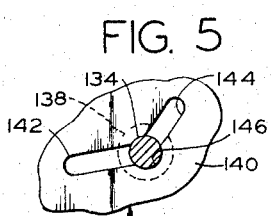
KAY SILVON
INVENTOR
BY
BUCKHORN, BLORE, KLARQUIST & SPARKMAN
ATTORNEYS United States Patent Office 3,435,860
Patented Apr. 1, 1969

3,435,860
TOP SHARPENING, FLOATING SPROCKET
CHAIN SAW
Kay Silvon, Portland, Oreg., assignor to Omark Industries,
Inc., Portland, Oreg., a corporation of Oregon
Filed Nov. 18, 1966, Ser. No. 595,487
Int. Cl. B27b 17/00; B23d 63/12
U.S. Cl. 143—32                                                10 Claims This invention relates to a top sharpening, floating sprocket chain saw, and more particularly to a chain saw in which a floating sprocket is reciprocated during sharpening of a saw chain on the sprocket to dress a sharpening member engaging the saw chain.

Top sharpeners for sharpening saw chains by moving a wearable abrasive sharpening member of each sharpener into engagement with the tips of projecting elements such as teeth and depth gauges of the saw chain, are disclosed and claimed in copending application Ser. No. 457,452 filed May 21, 1965, and assigned to the same assignee as this application. To dress the sharpening members, they are moved back and forth relative to the portions of the saw chains on drive sprockets which are held against axial movement, and are smoothly and uniformly dressed as the sharpening is effected. However, in a saw chain of the type having a floating sprocket which is free to move axially, reciprocation of a sharpening member would tend to also move the floating sprocket and the saw chain thereon and would make the dressing irregular. It would be desirable to provide a top sharpener for a floating sprocket chain saw adapted to smoothly and uniformly dress the sharpening member.

An object of the invention is to provide a top sharpening, floating sprocket chain saw.

Another object of the invention is to provide a chain saw in which a floating sprocket is reciprocated during sharpening of a saw chain on the sprocket to dress a sharpening member engaging the saw chain.

A further object of the invention is to provide a sharpener for a chain saw in which a floating sprocket thereof is engaged while relative movement laterally between the sprocket and a sharpening member is effected.

Another object of the invention is to provide a sharpener for a chain saw in which a floating sprocket moves a saw chain back and forth relative to a sharpening member to dress the sharpening member.

Yet another object of the invention is to provide a sharpener for a chain saw in which an actuator adapted to engage and reciprocate a floating sprocket of the chain saw is quickly detachable from the chain saw.

A still further object of the invention is to provide a sharpener for a chain saw having an actuator which effects relative lateral movement between a sharpening member and a floating sprocket and also holds the sharpening member against a saw chain on the sprocket.

Another object of the invention is to provide a sharpener for a chain saw having a floating sprocket and including a sharpening member movable from a storage position out of alignment with a saw chain on the sprocket to a sharpening position engaging the saw chain and held against lateral movement while the sprocket is reciprocated axially to simultaneously effect sharpening of the saw chain and dressing of the sharpening member.

The invention provides a chain saw in which relative reciprocation is effected between a sharpening member and a floating sprocket to dress the sharpening member while it sharpens projecting elements of a saw chain advanced by the sprocket. In a chain saw forming a specific embodiment of the invention, an arcuate, wearable, abrasive sharpening member is mounted on a carrier arm for movement between a storage position in which the arm is out of the projected area of a saw chain mounted on a floating sprocket and an operative position in which the sharpening member is in the projected area of the saw chain and the arm is pivotal toward the saw chain to move the sharpening member against the saw chain while being held against movement along the axis of the sprocket. A detachable manual actuator has a handle, a shaft portion, a forked portion on the shaft portion for engaging a flange of the sprocket, and an arm portion on the shaft portion for engaging the carrier arm. The forked portion and the arm portion are insertable through slots and the shaft portion is insertable into a bearing in a cover of the saw, until the arm portion is behind the carrier arm and the forked portion is aligned with the flange of the sprocket. The actuator then is turned, which first moves the forked portion over the flange of the sprocket and then moves the arm portion into engagement with the carrier arm. Upon further turning movement of the actuator, the arm portion presses the carrier arm toward the sprocket to move the sharpening member into engagement with the saw chain being driven by the sprocket to sharpen the tips of projecting elements of the saw chain. The actuator then is reciprocated to move the sprocket axially and move the saw chain back and forth across the sharpening member to dress the sharpening member while the saw chain is being sharpened.

A complete understanding of the invention may be obtained from the following detailed description of a top sharpening, floating sprocket chain saw forming a specific embodiment thereof, when read in conjunction with the appended drawings, in which:

FIG. 1 is a fragmentary, side elevation view of a top sharpening, floating sprocket chain saw forming one embodiment of the invention;

FIG. 2 is a horizontal sectional view taken substantially along line 2—2 of FIG. 1;

FIG. 3 is a vertical sectional view taken substantially along line 3—3 of FIG. 1;

FIG. 4 is a vertical sectional view taken substantially along line 4—4 of FIG. 1; and FIG. 5 is a vertical sectional view taken substantially along line 5—5 of FIG. 2.

Referring now in detail to the drawings, there is shown therein a chain saw having a top sharpener 10 for grinding tops 12 of projecting elements comprising slitting teeth 14, raker teeth 16 and depth gauges 18 of a saw chain 20 as the saw chain is advanced around a floating sprocket 22 and along a grooved saw bar 24 having a nose portion (not shown) of a greater diameter than that of the sprocket. A dressable, abrasive, sharpening member 26 of, for example, bonded abrasive material may be urged by an actuator or key 28 clockwise, as viewed in FIG. 1, into engagement with the tops 12 of the projecting elements to sharpen the teeth 14 and 16 and correspondingly reduce the height of the depth gauges, and the sprocket may be moved by the actuator axially back and forth along a drive shaft 30 while the sharpening member is held against such axial movement to dress the sharpening member. Preferably, the sharpening member is sufficiently long to always engage at least two of the projecting elements.

The sprocket has splines 32 (FIG. 2) slidable in splining grooves 34 in a splining sleeve 36 keyed to the shaft 30. The sprocket is of integral construction, and includes a hub portion 38 supporting two, axially spaced disc-like members 40 with teeth 42 positioned between the members 40 and forming with the members 40 recesses which receive driving portions 43 of center drive links 44 of the saw chain. Allochiral side links 46 (FIG. 1) carrying the slitting teeth 14 and side links 48 rest on the peripheries of the members 40 as the saw chain travels around the sprocket. The sprocket is held on the splining sleeve 36 and is movable between spacer rings 50. A washer 52 and a nut 54 threaded onto the end portion of the shaft 30 hold the spacer rings and the splining sleeve on the shaft along with a clutch housing 55. The sprocket has an axial sleeve portion 56 positioned loosely over the washer 52 and carrying an actuating flange 58. The saw bar 24 is secured to a main casting 60 of the saw by studs 62 and nuts 64, which also secure a cover 66 to the main casting.

The spacer rings 50 are so spaced apart relative to the length of the hub portion 38 and the width of the sharpening member 26 and the overall width of the saw chain that the dressing movement of the saw chain is from one extreme in which the slitting teeth 14 at one side of the chain are partially beyond the adjacent side of the sharpening member to the other extreme in which the slitting teeth 14 at the other side of the chain are partially beyond the side of the sharpening member adjacent to these last-mentioned slitting teeth, the saw bar 24 being spaced sufficiently far from the sprocket that the flexibility of the chain permits this range of movement of the sprocket. This range of movement insures complete dressing of the sharpening member. The sharpening member has a tapered or outwardly sloping approach end portion 80 to insure a gradual engagement of the projecting elements of the saw chain with the sharpening member. The thickness of the sharpening member preferably is just greater than that necessary for the sharpening member to last the useful life of the saw chain.

The sharpening member 26 is secured by a suitable adhesive to an arcuate face 82 (FIG. 1) of a carrier arm 84 having a bore 86 thereon fitting closely on an arbor or post 88 parallel to the shaft 30 and slidable and pivotal on the post 88. The post has an annular storage groove 90 (FIG. 3) and an annular operative groove 92, the groove 90 being adapted to receive a spring-pressed ball detent 94 (FIG. 1) carried by the carrier arm to hold the arm in its storage position shown in broken lines in FIG. 3, and the groove 92 being adapted to receive the ball detent to hold the carrier arm 84 in a position in the plane of the sprocket and against movement along the post 88 while permitting pivotal movement of the carrier arm on the post to move the sharpening member 26 toward and away from the saw chain 20. A pin 96 (FIGS. 1 and 2) rigid with the carrier arm 84 extends through an L-shaped slot 98 (FIG. 4) in a wall 100 of the cover 66. When the pin is in the horizontally extending portion of the slot, it holds the carrier arm and the sharpening member retracted back away from the saw chain 20. When the pin is in the vertically extending portion of the slot, there is permitted pivotal movement of the carrier arm to move the sharpening member into engagement with the saw chain while lateral movement, parallel to the drive shaft 30, of the carrier arm is prevented.

To provide the desired sharpening cut, an adjustment screw 110 (FIGS. 1 and 3) mounted rotatably in bores 112 and 114 in the wall 100 and a web 116 of the cover is turned a predetermined number of turns. The adjustment screw is held against axial movement to the lug by a pair of split rings 118 bracketing the web and fitting into grooves in the adjustment screw. Turning of the adjustment screw moves a rectangular stop 120, which is threaded onto the adjustment screw, along the screw to the right, as viewed in FIG. 1. The stop 120 is in the path of an end portion 122 of the carrier 84 and limits movement of the carrier arm toward the sprocket 22 and the saw chain 20 on the sprocket. A flat upper side 124 of the stop 120 engages the lower face of a top wall 126 of the cover 66 to prevent turning of the stop with the screw.

To move the carrier arm 84 and the sharpening member 26 from their storage positions to their sharpening positions, the pin 96 is grasped by the operator and the arm 84 is moved along the post 88 from its storage position detented by the grove 90 to its operative position detented by the groove 92. In the latter position of the arm 84, the pin 96 is movable along the vertical portion of the slot 98 to permit the arm 84 to be swung toward the portion of the saw chain 20. To effect movement of the carrier arm 84 and the sharpening member 26 toward sharpening positions and reciprocate the sprocket relative to the carrier arm and the sharpening member, the detachable actuator 28 is provided with an L-shaped arm portion 130 and a fork 132 both mounted rigidly on a shaft portion 134, with a handle 136 for moving the shaft portion axially and for turning the shaft portion. The shaft portion fits closely, slidably and rotatably in a bearing portion 138 of a front wall 140 of the cover. The bearing portion and the front wall have slots 142 and 144 at opposite sides of bore 146 of the bearing portion 138 to provide clearance for the arm portion 130 and the fork 132, respectively, to permit passage of the arm portion and the fork through the cover in assembling the actuator with the cover and in detaching the actuator from the cover. For such asembling and detaching, the arm portion 130 and the fork 132 are in their extreme counterclockwise positions shown in phantom lines in FIG. 1, in which positions the arm portion 130 can move freely behind the carrier arm 84 with the pin 96 in the vertical portion of the slot 98 but with the sharpening member 26 retracted away from the saw chain 20, and the fork 132 clears the actuating flange 58 of the sprocket 22. Then as the actuator is turned in a clockwise direction, the arm portion 130 and the fork 132 turn out of alignment with the slots 142 and 144, respectively, to move the arm portion 130 into engagement with the back side of the arm 84 and move the fork over the flange 58. Then on further clockwise movement of the actuator, the arm portion 130 moves the sharpening member 26 into sharpening engagement of the saw chain while the fork is still bracketing the flange 58. Reciprocation of the actuator then will move the sprocket 22 back and forth between the stop rings 50 (FIG. 2) to dress the sharpening member as the saw chain is sharpened. The actuator has a collar 160 to limit the distance that the arm portion 130 and the fork 132 can be inserted into the cover to an extreme position of the fork in which the fork can move over the flange 58 when the sprocket is in its extreme inward position. The fork 132 has a flared entrance portion 162 (FIG. 2) to facilitate movement of the fork over the flange. The length of an arm-engaging portion 164 of the arm portion 130 is sufficient to remain in full engagement with the carrier arm throughout the range of dressing movement of the actuator. The portion 164 is parallel to the shaft 30.

To insure dressing of the sharpening member across the entire width thereof, the pin 96 and the vertical portion of the slot 98 substantially center the sharpening member relative to the range of axial movement of the sprocket 22 as defined by the stop rings 50 and the distance of such axial movement of the sprocket is sufficient that the lateral extremes of the teeth 14 and 16 of the saw chain are moved outwardly beyond the side edges of the sharpening member at the extremes of reciprocation of the sprocket. The distance or range of dressing movement of the saw chain is just sufficiently greater than the width of the sharpening member 26 that each lefthand slitting tooth 14 is moved just partially beyond the lefthand side of the sharpening member 26 at one extreme of the dressing movement, and each righthand slitter tooth 14 is moved just partially beyond the righthand side of the sharpening member at the other extreme of the dressing movement.

In place of the actuator 28, which effects both the sharpening feed and the dressing movement, an actuator like the actuator 28 but with the arm portion 130 absent may be used to provide dressing movement and the sharpening feed may be effected by means of the pin 96 or by a flexible wire actuator (not shown).

It is to be understood that the above-described arrangements are simply illustrative of the application of the principles of the invention. Numerous other arrangements

What is claimed is:
1. In a chain saw:
a drive shaft,
a sprocket driven by the shaft and movable along the shaft between predetermined limits,
a saw chain having top sharpenable projecting elements and meshing with and driven by the sprocket,
a sharpening member,
sharpener feed means for moving the sharpening member transversely relative to the shaft from a retracted position out of engagement with the tops of the projecting elements of the portion of the saw chain on the sprocket to a sharpening position engaging said tops of the projecting elements,
and actuating means including means engaging the sprocket and adapted to create back and forth relative movement between the sprocket and the sharpener member in a direction parallel to the shaft to dress the sharpening member.

2. The chain saw of claim 1 including:
a saw bar for guiding the saw chain to and from the sprocket,
means positioning the saw bar from the sprocket sufficiently that the portions of the saw chain between the saw bar and the sprocket flex sufficiently to permit the sprocket to move to the extremes of said predetermined limits,
and carrier means holding the sharpening member against movement parallel to the shaft,
the actuating means including means for moving the means engaging the sprocket back and forth along the shaft.

3. The chain saw of claim 1 including means mounting the actuating means on the chain saw for quick assembly with and detachment from the chain saw.

4. The chain saw of claim 1 including:
cover means enclosing the sharpening member, the sprocket and the portion of the chain on the sprocket,
and guide means carried by the cover means for guiding the actuating means.

5. The chain saw of claim 4 wherein the actuating means includes a rod-like portion and the guide means includes a bearing portion mounting the rod-like portion for movement relative to the cover means.

6. The chain saw of claim 5 including carrier means carrying the sharpening member,
and means mounting the carrier means for movement transversely of the shaft and holding the carrier means against movement along the shaft,
the sprocket being provided with an actuating flange,
the actuating means including an arm portion for engaging the means mounting the carrier means and also including a forked portion for bracketing the actuating flange,
the guide means having a bore serving to mount the rod-like portion of the actuating means for longitudinal movement to move the sprocket along the shaft and for rotary movement to move the sharpening member toward the portion of the saw chain on the sprocket.

7. The chain saw of claim 6 wherein the cover means has a pair of slots intersecting the bore to permit the arm portion and the forked portion to be moved between the exterior and the interior of the cover means.

8. The chain saw of claim 5 including carrier means carrying the sharpening member,
and means mounting the carrier means for movement transversely of the shaft,
the actuating means including an arm portion offset from the rod-like portion for engaging the carrier means and moving the carrier means transversely of the shaft when the rod-like portion is rotated.

9. In a chain saw:
a drive shaft,
a sprocket driven by the shaft and movable along the shaft between predetermined limits,
a saw chain having top sharpenable projecting elements and meshing with and driven by the sprocket,
a dressable sharpening member,
sharpener feed means for moving the sharpening member transversely relative to the shaft from a retracted position out of engagement with the tops of the projecting elements of the portion of the saw chain on the sprocket to a sharpening position engaging said tops of the projecting elements,
and actuating means for moving the sprocket back and forth along the shaft to move the saw chain back and forth across the sharpening member to dress the sharpening member.

10. In a chain saw:
a drive shaft,
a sprocket having an actuating flange at one end thereof and driven by the shaft and movable along the shaft,
a pair of stop rings on the shaft limiting movement of the sprocket along the shaft through a predetermined range,
a grooved saw bar spaced from the sprocket,
a saw chain having top sharpenable projecting elements and meshing with and driven by the sprocket and extending along the grooved saw bar,
a dressable, abrasive, sharpening member having a beveled approach end,
a carrier arm mounting the sharpening member,
a post parallel to the shaft and mounting the carrier arm for pivotal movement to move the sharpening member transversely relative to the shaft from a retracted position out of engagement with the tops of the projecting elements of the portion of the saw chain on the sprocket to a sharpening position engaging said tops of the projecting elements and for movement along the post from a storage position to the retracted position,
a cover enclosing the arm, the sharpening member and the sprocket,
a bearing carried by the cover extending parallel to the shaft and having clearance slots,
and an actuator having a shaft portion, an offset arm portion for engaging the carrier arm and a fork for engaging the actuating flange at one end of the shaft portion and a handle at the other end of the shaft portion,
the arm portion and the fork being adapted to pass through the slots and the shaft portion fitting slidably and rotatably in the bearing.

References Cited

UNITED STATES PATENTS

| | | | |
|---|---|---|---|
| 3,040,602 | 6/1962 | Carlton | 76—38 |
| 3,138,973 | 6/1964 | Muir | 76—37 |
| 3,147,644 | 9/1964 | Oehrli | 76—37 |
| 3,260,287 | 7/1966 | Oehrli | 143—32 |

DONALD R. SCHRAN, *Primary Examiner.*

U.S. Cl. X.R.

76—37